(No Model.)
M. ITJEN.
DEVICE FOR DISPENSING BEER OR OTHER LIQUIDS.
No. 472,358. Patented Apr. 5, 1892.
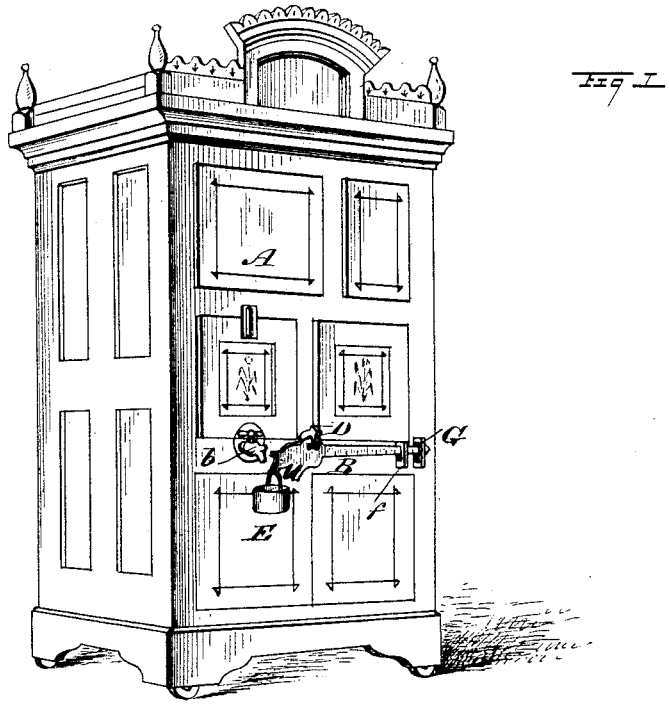
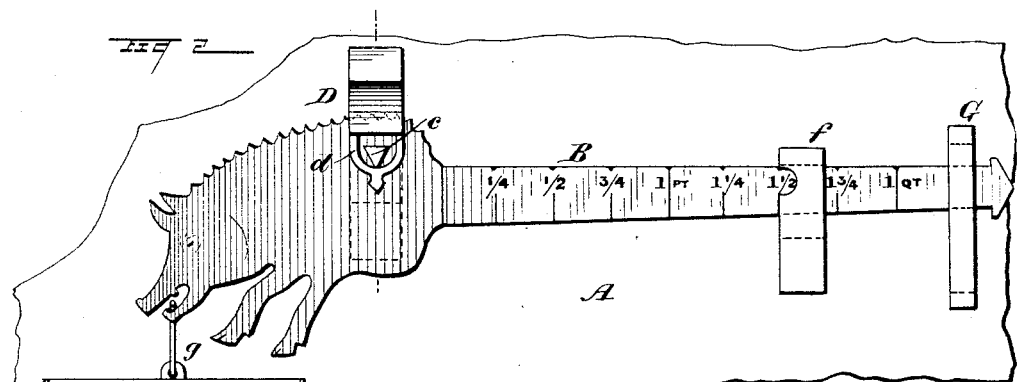
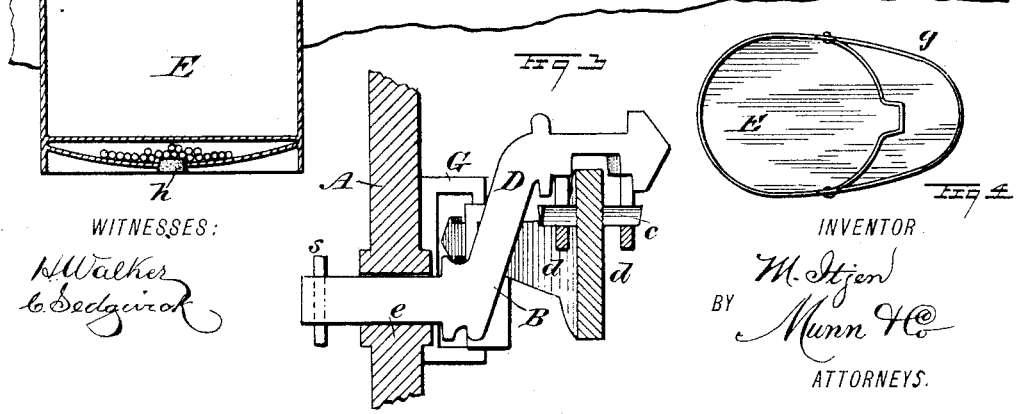
WITNESSES:
INVENTOR
ATTORNEYS.

UNITED STATES PATENT OFFICE.

MARTIN ITJEN, OF JACKSONVILLE, FLORIDA.

DEVICE FOR DISPENSING BEER OR OTHER LIQUIDS.

SPECIFICATION forming part of Letters Patent No. 472,358, dated April 5, 1892.

Application filed July 25, 1891. Serial No. 400,720. (No model.)

*To all whom it may concern:*

Be it known that I, MARTIN ITJEN, of Jacksonville, in the county of Duval and State of Florida, have invented a new and useful Improvement in Devices for Dispensing Beer or other Liquids, of which the following is a full, clear, and exact description.

This invention is an improvement in apparatus for dispensing beer or other beverages by weight instead of measure.

The invention consists in the novel construction and combinations of parts in apparatus for the purpose or purposes above cited, substantially as hereinafter described, and more particularly pointed out in the claim.

Reference is to be had to the accompanying drawings, forming a part of this specification, in which similar letters of reference indicate corresponding parts in all the figures.

Figure 1 represents a view in perspective of an ice-box with weighing attachment applied. Fig. 2 is a front elevation of the same in part upon a larger scale and with the receptacle into which the beer or liquid being weighed is drawn in section. Fig. 3 is a transverse vertical section in part upon the line 3 3 in Fig. 2, mainly showing the weighing devices; and Fig. 4 is a plan view of the beer-receiving receptacle.

A is an ice-box of the usual or any approved construction and pattern and designed to contain a keg of lager-beer, or it might be any number of kegs to be separately drawn from, with the tap or faucet $b$ of the keg projecting through to the outside of the front of the ice-box. This ice-box, which serves to keep the beer to be dispensed cool, is also made to carry the weighing devices, by which the beer is dispensed by weight. Thus B is a notched and graduated scale-beam arranged to occupy a position obliquely in front of the ice-box and made to rest near its front end by an attached knife-edged fulcrum $c$ in loops or bearings $d$ $d$, carried by a crank-shaped bracket D, the stem or base part of which passes through an opening in the front of the ice-box that forms a bearing $e$, through which said base part of the bracket is capable of being adjusted in or out to provide room in front of the ice-box for different-sized beer-receiving receptacles, one of which E is here shown, and to admit of the bracket being pushed in or drawn out for use with safety, a stop-pin $s$ being passed through the inner end of the stem to limit the distance which the bracket may be drawn out. The graduated scale-beam B, provided with a weight $f$, adjustable on or along it back of the fulcrum $c$, is guided at its back end by passing through a slotted guide or guard G, secured to the front of the ice-box. The front end of the beam is preferably made in the form of an animal, within or from the mouth of which the receiving-receptacle E is suspended, and the head of which bows or moves down when the required weight of beer regulated by the weight $f$ has been received in it from the keg through the faucet $b$. The bucket or receptacle E, which is detachably suspended by a bail $g$ from the front end of the beam, as described, hangs directly under the beer-faucet $b$, and can be quickly removed when supplied with the weighted quantity of beer required, which will be found very convenient. To give a more accurate adjustment in weighing, and to make all receiving or weighing cans, buckets, or receptacles, like the one E, of the same weight, each can or bucket is made with a false bottom, within which slot or other loose weights may be inserted on removing a plug or stopper $h$ in the bottom to effect the necessary adjustment.

By this weighing attachment or device drafts of cool beer may be drawn from the keg in quantities varying from a half-pint to a half-gallon (more or less) with perfect accuracy, regardless of the froth or foam on it, and without necessarily opening the ice-box. Much time will be saved to the vender of the beer, and the customer will be better satisfied and be served with dispatch. The correct quantity—that is, half-pint, quart, &c.— can readily be determined by the weight of the beer so dispensed, and which upon measure will be found perfectly accurate.

The apparatus can be made so as to weigh from a half-pint to a gallon, according to requirement.

Having thus described my invention, what

I claim as new, and desire to secure by Letters Patent, is—

In an apparatus for weighing beer, &c., the combination, with the fixed support A and a
5 scale-beam B, arranged alongside the same, of the bracket D and a fulcrum-piece c, connecting the latter with such scale-beam, the shank of said bracket being adapted to slide in said support, as shown and described, for the purpose specified.

MARTIN ITJEN.

Witnesses:
JOHN H. BALLOU,
JAMES JOYCE.